United States Patent [19]
Wilt et al.

[11] Patent Number: 5,952,443
[45] Date of Patent: Sep. 14, 1999

[54] ACETOACETATE FUNCTIONAL POLYSILOXANES

[75] Inventors: Truman F. Wilt, Clinton; David N. Walters, Slippery Rock, both of Pa.; Andrew R. Wolff, Lake Villa, Ill.

[73] Assignee: PPG Industries Ohio, Inc., Cleveland, Ohio

[21] Appl. No.: 08/904,596

[22] Filed: Aug. 1, 1997

[51] Int. Cl.⁶ .................................................. C08G 77/14
[52] U.S. Cl. .............................. 528/26; 528/29; 528/31; 528/15; 556/440
[58] Field of Search ................................ 528/26, 29, 31; 556/440

[56] References Cited

U.S. PATENT DOCUMENTS

| | | | |
|---|---|---|---|
| 3,317,460 | 5/1967 | Clark et al. | 260/46.5 |
| 3,398,174 | 8/1968 | Barnes | 260/448.2 |
| 3,668,183 | 6/1972 | Hoy et al. | 260/65 |
| 4,025,456 | 5/1977 | Litteral et al. | 252/351 |
| 4,408,018 | 10/1983 | Bartman et al. | 525/300 |
| 4,431,789 | 2/1984 | Okazaki et al. | 528/15 |
| 4,689,383 | 8/1987 | Riffle et al. | 528/12 |
| 4,772,680 | 9/1988 | Noomen et al. | 528/229 |
| 4,808,649 | 2/1989 | Gay et al. | 524/264 |
| 4,925,659 | 5/1990 | Grollier et al. | 424/78 |
| 4,987,177 | 1/1991 | Den Hartog et al. | 524/517 |
| 5,021,537 | 6/1991 | Stark et al. | 528/106 |
| 5,066,720 | 11/1991 | Ohsugi et al. | 525/100 |
| 5,242,978 | 9/1993 | Schäfer et al. | 525/102 |
| 5,248,789 | 9/1993 | Wolff | 549/215 |
| 5,260,469 | 11/1993 | Swiatek | 556/445 |
| 5,288,802 | 2/1994 | Walters et al. | 525/110 |
| 5,395,955 | 3/1995 | Okawa et al. | 556/449 |
| 5,432,233 | 7/1995 | Miyazoe et al. | 525/103 |

FOREIGN PATENT DOCUMENTS

| | | |
|---|---|---|
| 0277816 | 8/1988 | European Pat. Off. |
| 420 133 | 9/1990 | European Pat. Off. |
| 0586048 | 3/1994 | European Pat. Off. |
| 1 193 504 | 5/1965 | Germany. |
| 1 545 040 | 7/1970 | Germany. |
| 09227688 | 9/1997 | Japan. |
| 10017670 | 1/1998 | Japan. |
| 1293331 | 10/1972 | United Kingdom. |
| WO 95/28452 | 10/1995 | WIPO. |

OTHER PUBLICATIONS

"Synthesis of Novel Organic Oligomers Containing Si–H Bonds", T. Iwahara, M. Kusakabe, M. Chiba and K. Yonezawa, Journal of Polymer Science: Part A: Polymer Chemistry, vol. 31, pp. 2617–2631 (1993), John Wiley & Sons, Inc.

"Siloxanes with aliphatic isocyanate groups, A tetrafunctional cross–linking agent", Guangbin Zhou and Richard Fragnito, Johannes Smid, Polymer Bulletin 22, pp. 85–88 (1989), Springer–Verlag.

"Regioselective Rhodium–Containing Catalysts for Ring–Opening Polymerizations and Hydrosilylations", J.V. Crivello and M. Fan, Journal of Polymer Science: Part A: Polymer Chemistry, vol. 30, pp. 1–11 (1992), John Wiley & Sons, Inc.

*Primary Examiner*—Robert Dawson
*Assistant Examiner*—Caixia Lu-Rutt
*Attorney, Agent, or Firm*—William J. Uhl

[57] ABSTRACT

Functional polysiloxanes containing acetoacetate and curable coating compositions containing such polysiloxanes are disclosed. The curable compositions are usefull in coatings where they provide excellent appearance, pot-life, humidity resistance and improved adhesion to galvanized steel substrates. A method for preparing the functional polysiloxanes is also disclosed.

20 Claims, No Drawings

ACETOACETATE FUNCTIONAL POLYSILOXANES

BACKGROUND OF THE INVENTION

Polysiloxane polyols are well known in the art. Japanese Patent Publication 48-19941 describes polysiloxane polyols which are obtained by the dehydrogenation reaction between a polysiloxane hydride and an aliphatic polyhydric alcohol or polyoxyalkylene alcohol to introduce the alcoholic hydroxy groups onto the polysiloxane backbone. In practice, however, it is difficult to obtain an industrially significant yield of such polysiloxane polyols because such a dehydrogenation reaction readily gels. Another problem encountered with this dehydrogenation reaction is the difficulty in obtaining a solvent capable of dissolving both reactants. Strongly hydrophilic alcohols such as polyglycerols are highly soluble in alcohols and water, but insoluble in hydrocarbon solvents. Polysiloxanes, however, are generally only soluble in hydrocarbon solvents such as toluene or n-hexane.

U.S. Pat. No. 4,431,789 to Okszaki et al. discloses a polysiloxane polyol which is obtained by the hydrosilylation reaction between a polysiloxane containing silicon hydride and a polyglycerol compound having an aliphatically unsaturated linkage in the molecule. Examples of such polyglycerol compounds are those obtained by the reaction of allyl alcohol and glycidol or by the reaction of diglycerin and allyl glycidyl ether. This reaction, a so-called hydrosilylation reaction, is the addition reaction between an organosilicon compound having a hydrogen atom directly bonded to the silicon atom, i.e., a polysiloxane hydride, and an organic compound having aliphatic unsaturation in the molecule carried out in the presence of a catalytic amount of a Group VIII noble metal. The hydrosilylation reaction can proceed readily in the presence of an alcoholic solvent which can dissolve both reactants. The resulting polysiloxane polyols are useful as non-ionic surface active agents.

U.S. Pat. No. 5,260,469 discloses butoxylated polysiloxane polyols which are disclosed as being useful in cosmetics.

Also known in the art are acetoacetate functional acrylic crosslinking polymers. U.S. Pat. No. 4,408,018 to Bartnan et al. describes the introduction of pendant acetoacetate functional moieties onto an acrylic polymer backbone for crosslinking with alpha, beta-unsaturated esters via the Michael addition reaction. The acetoacetate functional acrylic polymers may be prepared in either of two ways. An acetoacetic ester of a hydroxyl group containing acrylic monomer, such as hydroxyethyl methacrylate or hydroxyethyl acrylate, can be produced by the transacetylation of the hydroxyl containing acrylic monomer with an acetoacetate. These acetylated monomers can then be copolymerized with other polymerizable monomers to introduce the acetoacetate moiety into the acrylic polymer chain. Alternatively, an acrylic polymer chain having hydroxyl functionality thereon can be transesterified with an alkyl acetoacetate to introduce the acetoacetate moiety into the acrylic polymer backbone. The references also disclose the acetoacetylation of the hydroxyl groups of a polyester polyol to yield an acetoacetate containing polyester.

SUMMARY OF THE INVENTION

The present invention relates to novel functional polysiloxanes and a method for the preparation of such polysiloxanes. Also disclosed is a curable coating composition containing the functional polysiloxanes.

The curable coating composition containing the functional polysiloxane is readily curable at ambient temperatures and produces a cured film with excellent performance properties such as cure speed, low VOC, excellent humidity resistance, flexibility and adhesion over galvanized steel.

The functional polysiloxane having the general structural formula:

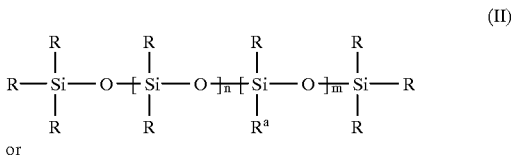

or

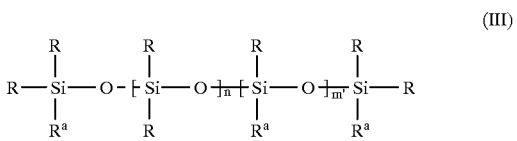

wherein the group represented by $R^a$ contains a group having the general structure:

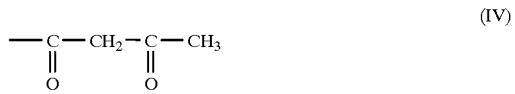

where the R groups are selected from the group consisting of OH and monovalent hydrocarbon groups connected to the silicon atoms, m is at least one; m' is 0 to 50, and n is 0 to 50. Preferably, the group $R^a$ contains a group having the general structure:

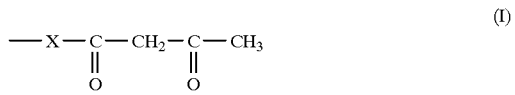

where X is NH, O or S.

The preparation of the functional polysiloxane of structural formula (I) comprises:
(a) hydrosilylating a polysiloxane containing silicon hydride, where the ratio of hydrosilylated silicon atoms to non-hydrosilylated silicon atoms is at least 0.1:1, and preferably 0.1 to 10:1, with an alcohol, primary or secondary amine, or thiol containing vinyl or vinylidene groups which are capable of hydrosilylating said polysiloxane containing silicon hydride, to yield a polysiloxane containing hydroxyl, amine or thiol groups or mixtures thereof; and
(b) esterifying the hydrosilylated reaction product of (a) with the acetoacetate to produce the acetoacetate functional polysiloxane.

The curable coating composition comprises:
(a) a functional polysiloxane having the general formula (II) or (III) wherein at least one of the groups represented by $R^a$ contains a group having the general structural formula (I) or (IV), where n is 0 to 50; m is at least one; m' is 0 to 50; and in the case of structural formula (I), X is NH, O or S; and the other R groups are selected from the group consisting of OH and monovalent hydrocarbon groups bonded to the silicon atoms; and
(b) a polyamine or a blocked polyamine. In the preferred embodiment of the invention, X is O. Optionally, the curable coating composition of the invention further comprises a polyacrylate curing agent.

The coated substrates have thereon a film comprising the cured reaction product of the following reactants:

(a) a functional polysiloxane having general structural formula (II) or (III) wherein at least one $R^a$ group contains a group represented by the structural formula (I) or (IV), where n is 0 to 50; m is at least one; m' is 0 to 50; and in the case of structural formula (I), X is NH, O or S; and the R groups are selected from the group consisting of H, OH and monovalent hydrocarbon groups; and (b) a polyamine or a blocked polyamine.

In the preferred embodiment of the invention, X is O. Optionally, the coated substrate may have a film thereon further comprising as one of the reactants a polyacrylate curing agent.

DETAILED DESCRIPTION OF THE INVENTION

The finctional polysiloxane of the present invention has the general formula (II) or (III) wherein at least one of the groups represented by $R^a$ contains a group having the general structure (I) or (IV) and in the case of (I) where X is —N, O or S, preferably O; the R groups are selected from the group consisting of OH and monovalent hydrocarbon groups bonded to the silicon atoms; and m is at least one; m' is 0 to 50; n is 0 to 50, preferably 0 to 35, and more preferably 2 to 15. By monovalent hydrocarbon groups is meant organic groups containing essentially carbon and hydrogen. The hydrocarbon groups may be aliphatic, aromatic, cyclic or acyclic and may contain from 1 to 24 (in the case of aromatic from 3 to 24) carbon atoms. Optionally, the hydrocarbon groups may be substituted with heteroatoms, typically oxygen. Examples of such monovalent hydrocarbon groups are alkyl, alkoxy, aryl, alkaryl or alkoxyaryl groups.

Preferably the functional polysiloxane has an equivalent weight of 100 to 1500, more preferably from 150 to 500 (grams/equivalent) based upon the equivalents of acetoacetate.

At least one of the groups represented by $R^a$ typically contains a group of the following general structure:

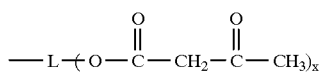

(V)

where L is an organic linking group and x is 1 to 3. Preferably L is alkylene, oxyalkylene or alkylene aryl. By alkylene is meant acyclic or cyclic alkylene groups having a carbon chain length of from $C_2$ to $C_{25}$. Examples of suitable alkylene groups are those derived from propene, butene, pentene, 1-decene, isoprene, myrcene and 1-heneicosene. By oxyalkylene is meant an alkylene group containing at least one ether oxygen atom and having a carbon chain length of from $C_2$ to $C_{25}$, preferably of from $C_2$ to $C_4$. Examples of suitable oxyalkylene groups are those associated with trimethylolpropane monoallylether, trimethylolpropane diallylether and ethoxylated allylether. By alkylene aryl is meant an acyclic alkylene group containing at least one aryl group, preferably phenyl, and having an alkylene carbon chain length of from $C_2$ to $C_{25}$. The aryl group may optionally be substituted. Suitable substituent groups may include hydroxyl, benzyl, carboxylic acid and aliphatic groups. Examples of suitable alkylene aryl groups include styrene and 3-isopropenyl-α, α-imethylbenzyl isocyanate.

Preferably the functional polysiloxane of the present invention is an acetoacetate functional polysiloxane and has the following general structural formula:

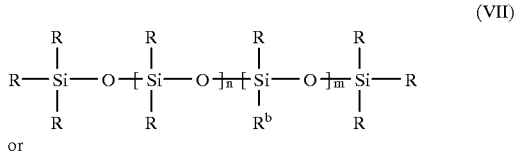

(VII)

or

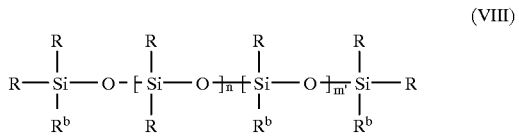

(VIII)

where m is at least one; m' is 0 to 50; n is 0 to 50; R is selected from the group consisting of OH and monovalent hydrocarbon groups connected to the silicon atoms; and at least a portion of $R^b$ groups has the following structure:

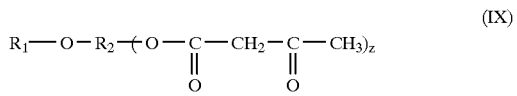

(IX)

or

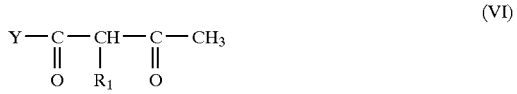

(VI)

wherein $R_1$ is alkylene, oxyalkylene or alkylene aryl; and $R_2$ is alkylene, oxyalkylene or alkylene aryl, and z is one to 3 and where Y is selected from the group consisting of alkyl, Cl, Br, I and OR', preferably where R' is $C_1$ to $C_{12}$ alky. When only a portion of the hydroxyl groups of the polysiloxane polyol produced in the hydrosilylation step are esterified, the remaining $R^b$ groups are:

L—OH and/or $R_1$—O-$R_2$—OH where L, $R_1$ and $R_2$ are as defined above.

Preferably, the ratio of m:n in the acetoacetate functional polysiloxane of structure (IV) is at least 0.1:1, preferably 0.1 to 10:1. Ratios less than 0.1 to 1 are not preferred because these materials are typically not compatible with organic materials (i.e., resins and solvents).

A method of preparing the acetoacetate functional polysiloxane of the present invention comprises (a) hydrosilylating a polysiloxane containing silicon hydride such as one having the structure:

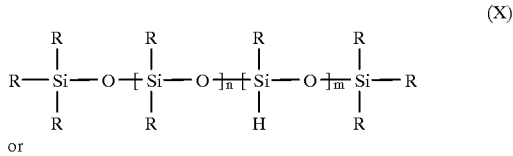

(X)

or

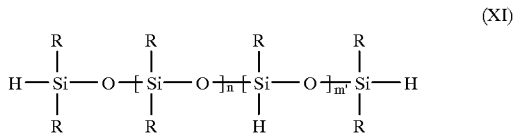

(XI)

wherein the R groups are selected from the group consisting of OH and monovalent hydrocarbon groups connected to the silicon atoms; n is 0 to 50; m is at least one; and m' is 0 to 50, such that the ratio of hydrogen-bonded silicon atoms to non-hydrogen-bonded silicon atoms is at least 0.1:1, preferably from 0.1 to 10:1; with an alcohol, primary or secondary amine, or thiol containing vinyl or vinylidene groups which are capable of hydrosilylating said polysiloxane containing silicon hydride, to produce a polysiloxane containing hydroxyl, amine or thiol groups or mixtures thereof; and (b) esterifying the hydrosilylated reaction product of (a) with an acetoacetate such as one having the structure:

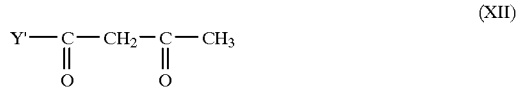

(XII)

where Y' is selected from the group consisting of Cl, Br, I and OR', preferably OR', where R' is $C_1$ to $C_{12}$ alkyl, to produce an acetoacetate functional polysiloxane.

Alternatively, the esterification can be conducted with the alcohol before the hydrosilylation step.

Preferably n is from about 0 to 50, more preferably from about 0 to 35, and even more preferably from 2 to 15. Examples of the polysiloxane containing silicon hydride are 1,1,3,3-tetramethyl disiloxane and polysiloxane containing silicon hydrides where n is 4 to 5, commercially available from PPG Industries, Inc. as MASILWAX BASE.

It is preferred that the polysiloxane containing silicon hydride is hydrosilylated with an alkenyl alcohol, preferably an allylic polyoxyalkylene alcohol. Examples of suitable alkenyl alcohols are allylic polyoxyalkylene alcohols and include polyethoxylated allylic alcohol, trimethylolpropane monoallylether and polypropoxylated allyl alcohol. In the most preferred embodiment of the invention, the alkenyl alcohol is trimethylolpropane monoallylether.

Typically the preparation of the acetoacetate functional polysiloxane is carried out in two steps: (1) a hydrosilylation step and (2) an esterification step. In step 1, the alcohol, primary or secondary amine, or thiol is added at ambient temperature to a reaction vessel equipped with a means for maintaining a nitrogen blanket. Added concurrently is about from 20 to 75 ppm sodium bicarbonate or metal acetate salt to inhibit the possible undesirable side reactions such as those associated with acetal condensation via a propenyl ether moiety. The temperature is increased to 75° C. under a nitrogen blanket at which time about 5% of the polysiloxane containing silicon hydride is added under agitation. A catalyst such as a transition metal, for example, nickel, nickel compounds and iridium salts, preferably chloroplatinic acid, is then added and the reaction is permitted to exotherm to 95° C. Addition of the remaining portion of the polysiloxane containing silicon hydride is completed as the reaction temperature is maintained at 80–85° C. The reaction is monitored by infrared spectroscopy for disappearance of the silicon hydride absorption band (Si—H: 2150 cm$^{-1}$).

To this product is added the acetoacetate and the temperature is increased to 120° C. under a nitrogen sparge. During heating, the evolving alcohol is collected. Complete distillation provides the acetoacetate functional polysiloxane of the present invention.

The curable coating composition of the present invention comprises (a) a functional polysiloxane of the structural formula (II) or (III) wherein at least one of the groups represented by $R^a$ contains a group having the general structural formula (IV) or (I), where n, m, m', R and X are as defined above for formulae (II) and (III); and (b) a polyamine or blocked polyamine. Preferably the functional polysiloxane has the general structural formula (VII) or (VIII) where n, m, m', z, $R_1$, $R_2$, $R_b$ and Y are all as defined above for formula (VI), (VII), (VIII) and (IX).

Preferably, the blocked polyamine is a polyketimine having the structure:

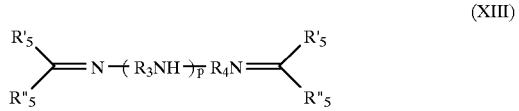

(XIII)

where p is 0 to 6; $R_3$ and $R_4$ are the same or different and are alkylene, oxyalkylene, or alkylene aryl; and the $R_5'$ and the $R_5''$ groups are independently H or alkyl containing from 2 to 20 carbon atoms, preferably 2 to 6 carbon atoms; or aryl containing from 6 to 24 carbon atoms; are each substantially inert to the ketimine formation reaction; and $R_5'$ and $R_5''$ together can form part of a 3,4,5, or 6 membered ring.

Besides ketimines, aldemines can also be used and unless otherwise indicated, ketimines and polyketimines is meant to include aldemines and polyaldemines. Preferably the polyketimine is the reaction product of a polyepoxide with a ketimine containing secondary amine group. The polyepoxide can be selected from materials which contain at least two oxirane groups in the molecule. An oxirane group may be represented by the general structural formula:

(XIV)

where q is at least two; $R_7$ is H or $CH_3$; and $R_8$ broadly represents an organic based molecule or polymer typically composed of carbon, hydrogen, oxygen, and optionally nitrogen and/or sulfur. Hydroxyl substituent groups can also be present and frequently are, as well as halogen and ether groups. Generally the epoxide equivalent weight ranges from about 100 to about 1000, preferably from about 100 to about 500, and more preferably from about 150 to about 250. These polyepoxides can be broadly categorized as being aliphatic, aromatic, cyclic, acyclic, alicyclic or heterocyclic.

One particularly preferred group of polyepoxides for use in the present invention are the epoxy novalac resins which are prepared by reacting an epihalohydrin with the condensation product of an aldehyde with a monohydric or polyhydric phenol. One example is the reaction product of epichlorohydrin with a phenolformaldehyde condensate.

Another particularly preferred group of polyepoxides are the polyglycidyl ethers of polyhydric aromatic alcohols, which are prepared by reacting an epihalohydrin, such as epichlorohydrin, with a polyhydric aromatic alcohol. Suitable examples of dihydric phenols include resorcinol, catechol, hydroquinone, bis(4-hydroxyphenyl)-1,1-isobutane; 4,4-dihydroxybenzophenone; bis(4-hydroxyphenyl)-1,1-ethane; bis(2-hydroxynaphenyl) methane; 1,5-hydroxynaphthalene and 4,4'-isopropylidenediphenol, i.e., Bisphenol A. Bisphenol A is preferred.

It should be understood that mixtures of polyepoxides may also be utilized in the present invention.

A specific example of a polyepoxide-ketimine reaction product involves reacting a polyamine such as one mole of diethylenetriamine with two moles of methylisobutyl ketone to produce a diketimine with secondary amine functionality.

Alternatively, an aldehyde such as isobutylaldehyde or benzaldehyde can be used in place of or in conjunction with the ketone to form an aldimine. This ketimine, or aldimine, is then reacted with a polyepoxide, depleting effectively all of the oxirane groups of the polyepoxide and resulting in a ketimine or aldimine which is essentially free of all oxirane groups. By "essentially free of oxirane groups" is meant that the epoxy equivalent weight of the reaction product is measured to be about at least 5000 (grams/equivalents), on average the reaction product contains less than 1, more preferably, on average, less than 0.5 oxirane groups per molecule.

Representative of the polyamines which may be utilized in the present invention are aliphatic or cycloaliphatic amines having from 2 to 200 carbon atoms and from 2 to 10 primary and/or secondary amino groups, preferably from 2 to 4 primary amino groups. Examples of suitable polyamines include ethylenediamine, propylenediamine, butylenediamine, pentamethylenediamine, hexamethylenediamine; decamethylenediamine; 4,7-dioxadecane-1,10-diamine; dodecamethylenediamine; 4,9-dioxadodecane-1,12-diamine; 7-methyl-4,10-dioxatridecane-1,13-diamine; 1,2-diaminocyclohexane; 1,4-diaminocyclohexane; 4,4'-diaminodicyclohexyl methane; isophorone diamine; bis(3-methyl-4-aminocyclohexyl)methane; 2,2-bis(4-aminocyclohexyl)propane; nitrile tris(ethane amine); bis(3-aminopropyl) methylamine; 2-amino-1-(methylamino) propane; 3-amino-1-(cyclohexylamino)propane; and N-(2-hydroxyethyl)ethylene diamine.

A particularly preferred group of polyamines that are useful in the practice of the present invention can be represented by the following structural formula:

$$H_2N-(-R_3-NH)_p-R_4-NH_2 \quad (XV)$$

where the $R_3$ and $R_4$ can be the same or different and represent an alkylene, oxyalkylene or alkylene aryl group containing from 2 to 20 and preferably from 2 to 10 carbon atoms and p is from about 1 to 6, preferably from about 1 to 3. Nonlimiting examples of polyalkylene polyamines suitable for use in the present invention include diethylenetriamine, dipropylenetriamine and dibutylenetriamine.

The aldehyde or ketone which is reacted with the polyamine can be represented by the following structural formula:

$$R'_5-\overset{\overset{\displaystyle O}{\|}}{C}-R''_5 \quad (XVI)$$

wherein $R_5$ and $R'_5$ are independently H, $C_2$ to $C_{20}$ alkyl or $C_6$ to $C_{24}$ aryl, and $R_5$ and $R'_5$ together can form part of a 3, 4, 5, or 6 membered ring. Examples of suitable aldehydes and ketones for use in the present invention as modifiers or blocking agents for the amine groups include, acetone, diethyl ketone, methylisobutyl ketone, diisobutyl ketone, isobutyraldehyde, hydroxybutyraldehyde, benzaldehyde, salicylaldehyde, pentanone, cyclohexanone, methylamyl ketone, ethylamyl ketone, hydroxycitronellal, isophorone and decanone. Ketones preferred for use in the present invention include acetone, diethyl ketone, diisobutyl ketone, pentanone, cyclohexanone, methylamyl ketone, isophorone, decanone and methylisobutyl ketone and methylphenyl ketone.

In one preferred embodiment of the present invention, the polyketimine is essentially free of oxirane functionality; has an average of at least two ketimine groups per molecule, preferably an average of about from 2 to about 25 ketimine groups per molecule, and more preferably of from about 3 to about 6 ketimine groups per molecule; and has a weight average molecular weight of from about 1000 to 50,000, preferably of from about 1000 to about 10,000, and more preferably of from about 1000 to about 5000, as determined by gel permeation chromatography (GPC) using a polystyrene standard.

Polyamines can also be used as component (b) in the curable composition. Examples of such polyamines are those described above.

Optionally, the curable coating composition of the present invention can contain a polyacrylate functional component. The preferred polyacrylate functional component contains at least two acryloyl groups or methacryloyl groups per molecule. Suitable polyacrylate functional components include the esterification or transesterification reaction products of acrylate or methacrylate containing materials, such as acrylic or methacrylic acids or acrylic or methacrylic esters as described in more detail below, with di-, tri- or polyvalent polyols, including polyester polyols and polyether polyols; and the reaction product of a hydroxyl group containing acrylate or methacrylate with a polyisocyanate.

The polyol used in the transesterification reaction is typically a low molecular weight diol, triol or tetrol. These polyols generally have a formula molecular weight ranging from about 50 to about 1000, and preferably from about 100 to about 500. Examples of suitable polyols include ethylene glycol, propylene glycol, diethylene glycol, tetramethylene diol, neopentyl glycol, hexamethylene diol, 1,6-hexanediol, cyclohexane diol, bis-(4-hydroxycyclohexyl) methane, glycerol, trimethylolethane, trimethylolpropane, tris(2-hydroxyethyl)-isocyanurate, pentaerythritol and ethoxylated Bisphenol A. Preferably a diol such as ethoxylated Bisphenol is used. It should be understood, however, that if desired, higher molecular weight polyols such as oligomeric or polymeric polyols can be utilized to prepare the polyacrylate containing material.

As aforementioned, the polyacrylate functional material may also be the reaction product of a polyisocyanate and a hydroxyl group containing acrylate or methacrylate. The polyisocyanate is typically a low molecular weight diisocyanate or triisocyanate having a formula weight of from about 200 to 1000, and preferably from about 200 to 600. Examples of suitable polyisocyanate materials include toluenediisocyanate, 4,4'-diphenylmethanediisocyanate, isophoronediisocyanate, tris(toluenediisocyanate) trimethylolpropane, 1,6-hexamethylenediisocyanate, 1,4-tetramethylenediisocyanate and 4,4'-methylenebis (cyclohexyl isocyanate). It should be understood, however, that if desired, higher molecular weight polyisocyanates, such as oligomeric or polymeric materials can be utilized to prepare the polyacrylate functional material.

The acrylate or methacrylate containing material, which is reacted either with the above-mentioned polyol or polyisocyanate to produce the polyacrylate functional material, can be represented by the general structural formula:

$$CH_2=\overset{\overset{\displaystyle R_9}{|}}{C}-O-\overset{\overset{\displaystyle O}{\|}}{C}-R_{10} \quad (XVII)$$

where $R_9$ is H or $CH_3$, and $R_{10}$ is H, alkyl containing from one to 20 carbons, or hydroxy alkyl containing from 1 to 20 carbons. Nonlimiting examples of suitable acrylate or methacrylate containing materials include acrylic acid, methacrylic acid, methyl methacrylate, ethyl methacrylate, butyl methacrylate, hexyl methacrylate, 2-hydroxyethyl methacrylate, methyl acrylate, ethyl acrylate, butyl acrylate, hexyl acrylate and 2-hydroxyethyl acrylate.

The polyacrylate functional materials used in the present invention generally have a weight average molecular weight of from about 100 to about 50,000 as determined by GPC using a polystyrene standard. In the preferred embodiment of the present invention, the polyacrylate functional materials are low molecular weight materials which have a formula weight generally from about 100 to about 5000, and more preferably from about 100 to about 500.

Examples of suitable polyacrylate functional materials include 1,6-hexanediol diacrylate, trimethylolpropane triacrylate, pentaerythritol tetraacrylate, ethoxylated bisphenol A diacrylate and tris(2-hydroxyethyl)isocyanurate triacrylate.

Although not intending to be bound by any theory, it is believed that the functional polysiloxane and the polyacrylate functional material, if present, react with the polyketimine to cure the claimed coating compositions. The reaction is believed to proceed by the deblocking of ketones from the polyketimine which exposes the primary amines which are believed to subsequently react with the acetoacetate functional polysiloxane and, if present, the polyacrylate functional material.

Optionally, an effective amount of acid catalyst can be used to accelerate the cure. Examples of appropriate acid catalysts include stearic acid, isostearic acid, undecylenic acid and phosphoric acid. It should be understood that any organic or inorganic acid could serve as a catalyst, but it is preferred that the acid be monofunctional. If used, the acid is generally present in minor amounts, typically from about 0.1 to about 1.0 percent by weight, the percentage based on total weight of resin solids.

It is preferred that the curable coating composition of the present invention be essentially free of strong base. By "strong base" is meant that the $pK_b$ of the base is greater than or equal to 11. By "essentially free of strong base" is meant that no more than 1 percent by weight, the percentage based on total weight of resin solids, is present in the composition. The presence of a strong base is believed to catalyze Michael addition between the acetoacetate functional polysiloxane and, if present in the composition, the polyacrylate functional material. (See Clemens et al., "A Comparison of Catalysts for Crosslinking Acetoacetylated Resins via the Michael Reaction", Journal of Coatings Technology, Vol. 61, No. 770, March 1989) Cure by this Michael reaction is not desirable since it has been observed to result in unacceptably reduced pot-life of the coating composition.

The curable coating compositions of the invention can be pigmented or unpigmented. Suitable pigments for color coats include opaque, transparent and translucent pigments generally known for use in coating applications. Examples include titanium dioxide, zinc oxide, antimony oxide, iron oxide, carbon black and phthalocyanine blue. Metallic pigments such as aluminum flake and metal oxide-coated micas can also be used. The coatings may also contain extender pigments such as calcium carbonate, clay, silica, talc, etc. When pigment is used, it typically present in the composition in amounts such that the pigment to binder ratio is from about 0.03 to 6.0:1.

In addition to the foregoing components, the coating compositions of the invention may include one or more optional ingredients such as plasticizers, anti-oxidants, light stabilizers, mildewcides and fungicides, surfactants and flow control additives or catalysts as are well known in the art.

The components present in the curable coating composition of the present invention generally are dissolved or dispersed in an organic solvent. Organic solvents which may be used include, for example, alcohols, ketones, aromatic hydrocarbons, esters or mixtures thereof. Specific examples include ethanol, acetone, methyl ethyl ketone, methyl amyl ketone, xylenes and butyl acetate. Typically, organic solvent is present in amounts of 5 to 80 percent by weight based on total weight of the composition.

The coating compositions of the invention are particularly useful as topcoats and particularly as primers. Because of their low temperature curing properties, they are particularly suitable for use in automotive refinish applications. Once the functional polysiloxane component and the polyamine or blocked polyamine component come into contact with each other, the coating composition will begin to cure at ambient conditions. Accordingly, it is desirable to prepare the compositions in the form of a two-package system with the polyamine or blocked polyamine component in one package and the functional polysiloxane component and, optionally, the polyacrylate functional material in a second package.

The functional polysiloxane is generally present in the curable coating composition of the present invention in amounts of 5 to about 65, and preferably from about 10 to about 25 percent by weight based on total weight of resin solids. The polyamine or blocked polyamine is generally present in amounts of from 25 to about 65, and preferably from about 35 to about 55 percent by weight based on total weight of resin solids. The optional polyacrylate functional material can be present in amounts up to 15, and preferably from about 2.5 to about 7.5 percent by weight based on total weight of resin solids.

The coating composition of the invention can be applied to the substrate by any conventional method such as brushing, dipping, flow coating, roll coating and spraying. Typically, they are most often applied by spraying. The compositions can be applied over a wide variety of primed and unprimed substrates such as wood, metal, glass, cloth, plastics, leather, foams and the like. Although the compositions can be cured at ambient temperatures, they can be cured at elevated temperatures to hasten the cure. An example would be forced air curing in a down draft booth at about 40° to 60° C. which is common in the automotive refinish industry.

The compositions of the invention in the pigmented form can be applied directly to a substrate to form a color coat. The color coat may be in the form of a primer for subsequent application of a top coat or may be a colored top coat. When used as a primer coating, thicknesses of 0.4 to 4.0 mils are typical. When used as a color top coat, coating thicknesses of about 0.5 to 4.0 mils are usual.

In applying composite coatings using the coating composition of the present invention, the initially applied coating can be cured prior to the application of the second coat. Alternatively, the coating can be applied by a wet-on-wet technique in which the second coating is applied to the first coating (usually after a flash time at room temperature or slightly elevated temperature to remove solvent or diluent, but insufficient time to cure the coating) and the two coatings are co-cured in a single step.

Only one of the coatings in the composite coating needs to be based on the coating composition of the present invention. The other coating composition can be based on a film-forming system containing a thermoplastic and/or thermosetting film-forming resin well known in the art such as cellulosics, acrylics, polyurethanes, polyesters including alkyds, aminoplasts, epoxies and mixtures thereof. These film-forming resins are typically formulated with various other coatings ingredients such as pigments, solvents and optional ingredients mentioned above.

The curable coating compositions of the present invention are particularly useful as primer surfacer coating compositions for automotive refinish applications. The compositions can be applied by any of the foregoing means of application directly to bare metal surfaces and, after being allowed to dry and the finish prepared such as by sanding, coated directly with a color top coat or a color-clear composite coating. The claimed coating compositions can be used as a single primer or undercoat beneath a top coat replacing separate undercoats which have historically been required to obtain optimum results.

The following examples illustrate the invention and should not be construed as a limitation on the scope thereof. Unless specifically indicated otherwise, all percentages and amounts are by weight.

EXAMPLE 1

This example describes the preparation of a disiloxane tetrol, a product of the hydrosilylation step in the preparation of the acetoacetate functional polysiloxane of the present invention. The disiloxane tetrol was prepared from the following mixture of ingredients:

| Ingredients | Equivalent Weight | Equivalents | Parts By Weight (grams) |
|---|---|---|---|
| Charge I: | | | |
| Trimethylolpropane monoallylether | 174.0 | 7.7 | 1335.7 |
| Charge II: | | | |
| 1,1,3,3-tetramethyldisiloxane | 67.0 | 7.7 | 515.2 |
| Charge III: | | | |
| Chloroplatinic acid | | | 10 ppm |

To a suitable reaction vessel equipped with a means for maintaining a nitrogen blanket, Charge I and an amount of sodium bicarbonate equivalent to 20 to 25 ppm of total monomer solids were added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 $cm^{-1}$).

EXAMPLE 2

This example describes the preparation of a polysiloxane tetrol, a product of the hydrosilylation of MASILWAX BASE siloxane with an approximate degree of polymerization of 3 to 4, i.e., $(SiO)_3$ to $(SiO)_4$. The siloxane tetrol was prepared from the following mixture of ingredients:

| Ingredients | Equivalent Weight | Equivalents | Parts By Weight (grams) |
|---|---|---|---|
| Charge I: | | | |
| Trimethylolpropane monoallylether | 174.0 | 9.4 | 1630.0 |
| Charge II: | | | |
| MASILWAX BASE[1] | 156.7 | 9.4 | 1467.4 |
| Charge III: | | | |
| Chloroplatinic acid | | | 10 ppm |

[1]Polysiloxane containing silicon hydride, commercially available from PPG Industries, Inc.

To a suitable reaction vessel equipped with a means for maintaining a nitrogen blanket, Charge I and an amount of sodium carbonate equivalent to 20 to 25 ppm of total monomer solids were added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si-H, 2150 $cm^{-1}$).

EXAMPLE 3

This example describes the preparation of a disiloxane propoxyldiol, a product of the hydrosilylation step of tetramethyl disiloxane. The disiloxane propoxyldiol was prepared from the following mixture of ingredients:

| Ingredients | Equivalent Weight | Equivalents | Parts By Weight (grams) |
|---|---|---|---|
| Charge I: | | | |
| Allyl Propoxylate[1] | 150.8 | 3.0 | 452.4 |
| Charge II: | | | |
| Tetramethyldisiloxane | 67.0 | 3.0 | 201.0 |
| Charge III: | | | |
| Chloroplatinic acid | | | 10 ppm |

[1]Commercially available as ARCAL AP1375 from ARCO Chemical Company.

To a suitable reaction vessel equipped with a means for maintaining a nitrogen blanket, Charge I and an amount of sodium bicarbonate equivalent to 20 to 25 ppm of total monomer solids were added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 $cm^{-1}$).

EXAMPLE 4

This example describes the preparation of a polysiloxane propoxyldiol, a product of the hydrosilylation of MASIL- WAX. The polysiloxane propoxyldiol was prepared from the following mixture of ingredients:

| Ingredients | Equivalent Weight | Equivalents | Parts By Weight (grams) |
|---|---|---|---|
| Charge I: | | | |
| Allyl Propoxylate[1] | 150.8 | 3.0 | 452.4 |
| Charge II: | | | |
| MASILWAX BASE[2] | 156.7 | 3.0 | 468.0 |
| Charge III: | | | |
| Chloroplatinic acid | | | 10 ppm |

[1]Commercially available as ARCAL AP1375 from ARCO Chemical Company.
[2]Polysiloxane-containing silicon hydride, commercially available from PPG Industries, Inc.

To a suitable reaction vessel equipped with a means for maintaining a nitrogen blanket, Charge I and an amount of sodium bicarbonate equivalent to 20 to 25 ppm of total monomer solids were added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

EXAMPLE 5

This example describes the preparation of a styrenated polysiloxane polyol, a product of the hydrosilylation of a polysiloxane with an approximate degree of polymerization of 34, i.e., $(Si—O)_{34}$. The polysiloxane polyol was prepared from the following mixture of ingredients:

| Ingredients | Equivalent Weight | Equivalents | Parts By Weight (grams) |
|---|---|---|---|
| Charge I: | | | |
| Alpha-methylstyrene | 118.0 | 2.3 | 272.9 |
| Polysiloxane $(Si—O)_{34}$[1] | 162.2 | 3.1 | 501.5 |
| Charge II: | | | |
| Trimethylolpropane monoallylether | 174.0 | .97 | 168.0 |
| Charge III: | | | |
| Chloroplatinic acid | | | 10 ppm |

[1]Polysiloxane $(Si—O)_{34}$ containing silicon hydride.

To a suitable reaction vessel equipped with a means for maintaining a nitrogen blanket, Charge I was added at ambient conditions. Added to the reaction vessel was 135 microliters, 7.5% solution of chloroplatinic acid, equivalent to 10 ppm of active platinum based on total monomer solids. The temperature was gradually increased to 80° C. under a nitrogen blanket. The reaction was then allowed to exotherm to 151° C., then subsequently cooled back to 80° C., at which time Charge II was added. with 70 ppm of potassium acetate. The reaction was again allowed to exotherm to approximately 150° C. before cooling to and maintaining at 95° C. while monitoring by infrared spectroscopy for disappearance of the silicon hydride absorption band (Si—H, 2150 cm$^{-1}$).

EXAMPLE 6

This example describes the acetoacetylation of the disiloxane tetrol of Example 1 to produce the acetoacetate functional polysiloxane of the present invention. The acetoacetate functional polysiloxane was prepared from the following mixture of ingredients:

| Ingredients | Equivalent Weight | Equivalents | Parts By Weight (grams) |
|---|---|---|---|
| Charge I | | | |
| Disiloxane tetrol of Example 1 | 123.4 | 0.8 | 100.0 |
| Charge II | | | |
| Tertiary butylacetoacetate | 158.0 | 0.8 | 126.4 |

To a suitable reaction vessel equipped with a means for a nitrogen sparge were added Charge I and Charge II at ambient conditions. The temperature was gradually increased to 120° C. under a nitrogen sparge. During heating, the evolving tertiary butanol was collected and atmospheric distillation was continued for about one hour at 120° C. at which time the remaining t-butanol was removed by vacuum distillation (at 30 mm Hg). Completion of the distillation provided the acetoacetate functional polysiloxane of the present invention which was confirmed by the OH value, volume of tertiary butanol collected and the disappearance of OH as determined by IR analysis. Also, the structure can be determined by NMR and elemental analysis.

EXAMPLE 7

This example describes the acetoacetylation of the polysiloxane tetrol of Example 2 to produce the acetoacetate functional polysiloxane of the present invention. The acetoacetate functional polysiloxane was prepared from the following mixture of ingredients:

| Ingredients | Equivalent Weight | Equivalents | Parts By Weight (grams) |
|---|---|---|---|
| Charge I | | | |
| Polysiloxane tetrol of Example 2 | 179.2 | 2.2 | 385.6 |
| Charge II | | | |
| Tertiary butylacetoacetate | 158.0 | 2.2 | 340.0 |

To a suitable reaction vessel equipped with means for a nitrogen sparge were added Charge I and Charge II at ambient conditions. The temperature was gradually increased to 120° C. under a nitrogen sparge. During heating, the evolving tertiary butanol was collected and atmospheric distillation was continued for about one hour at 120° C. at which time the remaining t-butanol was removed by vacuum distillation (at 30 mm Hg). Completion of the distillation provided the acetoacetate functional polysiloxane of the present invention which was confirmed by the methods in Example 6.

EXAMPLE 8

This example describes the acetoacetylation of the polysiloxane propoxyldiol of Example 4 to produce the acetoacetate functional polysiloxane of the present invention. The acetoacetate functional polysiloxane was prepared from the following mixture of ingredients:

| Ingredients | Equivalent Weight | Equivalents | Parts By Weight (grams) |
|---|---|---|---|
| Charge I | | | |
| Polysiloxane propoxyldiol of Example 4 | 283.3 | 2.8 | 800.0 |
| Charge II | | | |
| Tertiary butylacetoacetate | 158.0 | 2.8 | 445.6 |

To a suitable reaction vessel equipped with means for a nitrogen sparge were added Charge I and Charge II at ambient conditions. The temperature was gradually increased to 120° C. under a nitrogen sparge. During heating, the evolving tertiary butanol was collected and atmospheric distillation was continued for about one hour at 120° C. at which time the remaining t-butanol was removed by vacuum distillation (at 30 mm Hg). Completion of the distillation provided the acetoacetate functional polysiloxane of the present invention which was confirmed by the methods in Example 6.

EXAMPLE 9

This example describes the acetoacetylation of the styrenated polysiloxane polyol of Example 5 to produce the acetoacetate functional polysiloxane of the present invention. The acetoacetate functional polysiloxane was prepared from the following mixture of ingredients:

| Ingredients | Equivalent Weight | Equivalents | Parts By Weight (grams) |
|---|---|---|---|
| Charge I | | | |
| Styrenated polysiloxane of Example 5 | 485.3 | 0.649 | 315.0 |
| Charge II | | | |
| Tertiary butylacetoacetate | 158.0 | 0.649 | 102.5 |

To a suitable reaction vessel equipped with means for a nitrogen sparge were added Charge I and Charge II at ambient conditions. The temperature was gradually increased to 120° C. under a nitrogen sparge. During heating, the evolving tertiary butanol was collected and atmospheric distillation was continued for about one hour at 120° C. at which time the remaining t-butanol was removed by vacuum distillation (at 30 mm Hg). Completion of the distillation provided the acetoacetate functional polysiloxane of the present invention which was confirmed by the methods in Example 6.

EXAMPLE 10

This example describes the preparation of a two-component curable primer coating composition containing the acetoacetylated disiloxane tetrol of Example 6. The pre-blended crosslinker component, which contains the acetoacetylated disiloxane tetrol, was combined under agitation with the pigmented component which is commercially available as NCP-270 from PPG Industries, Inc. just prior to application to a metal substrate.

| INGREDIENT | Formula Weight (grams) | Solid Weight (grams) |
|---|---|---|
| PIGMENTED COMPONENT: | | |
| methyl isobutyl ketone (MIBK) | 26.3 | — |
| butyl acetate | 28.8 | — |
| xylene | 16.7 | — |
| novalac ketimine resin (in MIBK)[1] | 42.7 | 35.2 |
| acrylic grind resin (in Butyl Acetate)[8] | 6.7 | 4.0 |
| Dysperbyk 110[2] | 4.4 | 2.2 |
| MPA2000T polyethylene wax[3] | 2.1 | 0.4 |
| talc | 77.9 | 77.9 |
| Bentone SD-2[4] | 3.9 | 3.9 |
| Titanium dioxide | 31.5 | 31.5 |
| barium sulfate | 35.1 | 35.1 |
| silica | .9 | .9 |
| zinc phosphate | 32.3 | 32.3 |
| iron oxide | 6.5 | 6.5 |
| carbon black | 1.1 | 1.1 |
| butyl acetate | 8.6 | — |
| ketimine resin (in MIBK)[7] | 26.3 | 24.5 |
| Subtotal | 351.8 | 255.5 |
| CROSSLINKER COMPONENT: | | |
| acetone | 6.7 | — |
| methyl amyl ketone | 7.6 | — |
| xylene | 7.1 | — |
| siloxane acetoacetate of Example 6 | 51.9 | 51.9 |
| epoxy silane[5] | 5.0 | 5.0 |
| diacrylate resin[6] | 5.0 | 5.0 |
| isostearic acid | .2 | .2 |
| Subtotal | 83.5 | 62.1 |
| Total | 435.3 | 317.6 |

[1]Reaction product of an epoxy novalac (EPN 1139) available from Ciba Geigy and the ketimine of diethylene triamine and methyl isobutyl ketone.
[2]Wetting agent available from BYK-Chemie.
[3]Wax dispersion available from Rheox Inc.
[4]Antisettling agent available from Rheox Inc.
[5]Adhesion promoter available as A-187 from OSi Specialties Inc.
[6]Bisphenol A diacrylate available from Sartomer Corp.
[7]Ketimine of isophorone diamine and MIBK.
[8]Acrylic copolymer of styrene, diethyl aminoethyl methacrylate, methyl methacrylate, hydroxyethyl methacrylate, 2-ethylhexyl acrylate and 2-ethylhexyl methacrylate (23.1/21.5/18.5/18.0/9.2/9.2 weight ratio); 60% solids in butyl acetate.

EXAMPLE 11

This example describes the preparation of a two-component curable primer coating composition containing the acetoacetylated polysiloxane tetrol of Example 7 in accordance with the present invention. The pre-blended crosslinker component which contains the acetoacetylated polysiloxane tetrol was combined under agitation with the pigmented component, which is commercially available as NCP-270 from PPG Industries, Inc., just prior to application to a metal substrate.

| INGREDIENT | Formula Weight (grams) | Solid Weight (grams) |
|---|---|---|
| PIGMENTED COMPONENT: | | |
| Methyl isobutyl ketone (MIBK) | 10.9 | — |
| Butyl acetate | 11.9 | — |
| Xylene | 6.9 | — |
| Novalac ketimine resin (in MIBK) as in Example 10 | 17.6 | 14.5 |
| Acrylic grind resin (in butyl acetate) as in | 2.8 | 1.7 |

-continued

| INGREDIENT | Formula Weight (grams) | Solid Weight (grams) |
|---|---|---|
| Example 10 | | |
| Dysperbyk 110 | 1.8 | .9 |
| MPA2000T polyethylene wax | .9 | .2 |
| Talc | 32.1 | 32.1 |
| Bentone SD-2 | 1.6 | 1.6 |
| Titanium dioxide | 13.0 | 13.0 |
| Barium sulfate | 14.5 | 14.5 |
| Silica | .4 | .4 |
| Zinc phosphate | 25.7 | 25.7 |
| Iron oxide | 2.7 | 2.7 |
| Carbon black | .5 | .5 |
| Butyl acetate | 3.5 | — |
| Ketimine resin (in MIBK) as in Example 10 | 10.9 | 10.2 |
| Subtotal | 157.7 | 118.0 |
| CROSSLINKER COMPONENT: | | |
| Acetone | 6.8 | - |
| Methyl amyl ketone | 3.8 | - |
| Xylene | 3.5 | - |
| Polyester acetoacetate resin[1] | 16.4 | 16.4 |
| Siloxane acetoacetate of Example 7 | 6.8 | 6.8 |
| Epoxy silane as in Example 10 | 2.5 | 2.5 |
| Diacrylate resin as in Example 10 | 2.5 | 2.5 |
| Isostearic acid | .1 | .1 |
| SUBTOTAL | 42.4 | 28.3 |
| Total | 200.1 | 146.3 |

[1] Acetoacetylated polyester made from neopentyl glycol/trimethylol propane/ethylene glycol/cyclohexyl dimethanol/isophthalic anhydride, 1,4-cyclohexyl dicarboxylic acid/tertiary butyl acetoacetate (2.4/16.7/2.9/3.3/7.7/8.0/59.0 weight ratio).

COMPARATIVE EXAMPLE 12

By way of comparison, this example describes the preparation of a two component curable primer coating composition which contains in the crosslinker component an acetoacetate functional polyester only, with no acetoacetate functional siloxane. The pre-blended crosslinker component, which contains the acetoacetylated polyester, and is commercially available as NCX 275 from PPG Industries, Inc. is combined under agitation with the pigmented component which is commercially available as NCP-270 from PPG Industries, Inc. just prior to application to a metal substrate.

| INGREDIENT | Formula Weight (grams) | Solid Weight (grams) |
|---|---|---|
| PIGMENTED COMPONENT: | | |
| Methyl isobutyl ketone (MIBK) | 21.5 | — |
| Butyl acetate | 23.5 | — |
| Xylene | 13.7 | — |
| Novalac ketimine resin (in MIBK) as in Example 10 | 35.0 | 28.9 |
| Acrylic grind resin (in BuAcetate) as in Example 10 | 5.5 | 3.3 |
| Dysperbyk 110 | 3.6 | 1.8 |
| MPA2000T polyethylene wax | 1.7 | .34 |
| Talc | 63.7 | 63.7 |
| Bentone SD-2 | 3.2 | 3.2 |
| Titanium dioxide | 25.8 | 25.8 |
| Barium sulfate | 28.7 | 28.7 |
| Silica | .8 | .8 |
| Zinc phosphate | 50.9 | 50.9 |
| Iron oxide | 5.3 | 5.3 |
| Carbon black | .9 | .9 |
| Butyl acetate | 7.0 | — |
| Ketimine resin (in MIBK) as in Example 10 | 21.7 | 20.1 |
| Subtotal | 311.6 | 233.7 |
| CROSSLINKER COMPONENT: | | |
| Acetone | 11.1 | — |
| Methyl amyl ketone | 6.3 | — |
| Xylene | 5.8 | — |
| Polyester acetoacetate resin as in Example 10 | 38.0 | 38.0 |
| Epoxy silane as in Example 10 | 4.1 | 4.1 |
| Diacrylate resin as in Example 10 | 4.1 | 4.1 |
| Isostearic acid | .1 | .1 |
| Subtotal | 69.5 | 46.3 |
| Total | 381.0 | 280.0 |

Prior to coating, test panels of various metal substrates were prepared by mechanically abrading the surface with a machine sander and cleaning the panel of sanding residue. Each of the primer coating compositions from the above Example 10 and Comparative Example 12 were spray applied using conventional spray equipment to a variety of metal substrate test panels and allowed to cure at ambient conditions for two hours. A basecoat/clearcoat system, DBC-9700/DCU-2020, commercially available from PPG Industries, Inc. was spray applied using conventional spray equipment and allowed to cure at ambient conditions for one week. The multilayer coating system was tested for adhesion under various conditions.

Each of the primer coating compositions from the above Example 11 and Comparative Example 12 were spray applied using conventional spray equipment to test panels of cold rolled steel and electrogalvanized steel substrate which had been mechanically abraded and cleaned of all sanding residue. The primer coatings were allowed to cure at ambient conditions for two hours. A commercial topcoat, DCC-9300, available from PPG Industries, Inc. was spray applied using conventional spray equipment and allowed to cure at ambient conditions for one week. The multilayer coating system was tested for adhesion under various conditions.

These formulations were examined for adhesion to a variety of substrates via ASTM D-3359. The results are reported on a scale of 0–5 with a 5 representing 100% adhesion and a 0 representing greater than 65% loss of adhesion. A rating of 4 represents less than 5% adhesion loss, 3 represents an adhesion loss of 5–15%, a 2 represents an adhesion loss of 15–35% and 1 represents an adhesion loss of 35–65%. Adhesion was also determined after humidity resistance testing. Humidity resistance is performed by placing the cured panels in a cabinet maintained at 100° F. and 100% relative humidity for a total of 96 hours. The panels are then removed and examined for adhesion immediately and again after 4 hours recovery at room temperature and humidity. Test results for Example 10 and Comparative Example 12 are summarized in the following TABLE 1. The results for Example 11 and Comparative Example 12 are summarized in the following TABLE 2.

TABLE 1

| COATING FORMULATION | SUBSTRATE | ADH. 24 hrs | ADH. 7 days | ADH. Hum. | ADH. Rec. | HUMIDITY COMMENTS |
|---|---|---|---|---|---|---|
| Example 10 | aluminum | 5 | 5 | 4 | 5 | good |
| Example 12 (Comparative) | aluminum | 5 | 5 | 1 | 3 | good |
| Example 10 | cold rolled steel | 5 | 5 | 5 | 5 | good |
| Example 12 (Comparative) | cold rolled steel | 5 | 5 | 1 | 5 | good |
| Example 10 | electrogalvanized steel | 5 | 5 | 4 | 5 | good |
| Example 12 (Comparative) | electrogalvanized steel | 0 | 0 | 0 | 0 | microblisters |
| Example 10 | galvanneal steel | 5 | 5 | 0 | 5 | dense microblisters |
| Example 12 (Comparative) | galvanneal steel | 0 | 0 | 0 | 0 | small blisters |

TABLE 2

| COATING FORMULATION | SUBSTRATE | ADH. 24 hrs. | ADH. 7 days | ADH. Hum. | ADH. Rec. | HUMIDITY COMMENTS |
|---|---|---|---|---|---|---|
| Example 11 | cold rolled steel | 5 | 5 | 4 | 4 | good |
| Example 11 | electrogalvanized steel | 5 | 5 | 3 | 4 | good |
| Example 12 (comparative) | cold rolled steel | 5 | 5 | 2 | 3 | slight blistering |
| Example 12 (comparative) | electrogalvanized steel | 5 | 5 | 0 | 2 | moderate blistering |

EXAMPLE 13

This example describes the preparation of a two-component curable sealer coating composition containing the acetoacetylated polysiloxane tetrol of Example 7 in accordance with the present invention. The pre-blended crosslinker component which contains the acetoacetylated polysiloxane tetrol was combined under agitation with the pigmented component just prior to application to a metal substrate.

| INGREDIENT | Formula Weight (grams) | Solid Weight (grams) |
|---|---|---|
| PIGMENTED COMPONENT: | | |
| Methyl amyl ketone (MAK) | 2.7 | — |
| Butyl acetate | 2.6 | — |
| Xylene | 2.9 | — |
| Novalac ketimine resin of Example 10 | 20.4 | 16.6 |
| Methyl isobutyl ketone | 2.7 | |
| MPA 200T polyethylene wax | | |
| BENTONE SD-2 | 0.8 | 0.8 |
| Silicone additive[1] | 1.3 | 0.7 |
| Talc | 17.9 | 17.9 |
| Neutral TiO$_2$ | 27.6 | 27.6 |
| Barium sulfate | 18.8 | 18.8 |
| Silica | 0.4 | 0.4 |
| Carbon black | 0.2 | 0.2 |
| Silicone additive[2] | 0.2 | 0.1 |
| Methyl isobutyl ketone | 5.3 | — |
| Ketimine resin in MAK[3] | 7.1 | 5.5 |
| Methyl amyl ketone | 5.7 | — |
| Butyl benzyl phthalate | 4.3 | 4.3 |
| Silicone additive[1] | 0.7 | — |
| Subtotal | 122.9 | 93.1 |
| Acetone | 11.9 | — |
| Methyl amyl ketone | 15.3 | — |
| Xylene | 2.8 | — |
| Siloxane acetoacetate of Example 7 | 39.4 | 39.4 |
| Adhesion promoter as in Example 10 | 3.7 | 3.7 |
| Diacrylate resin as in Example 10 | 3.7 | 3.7 |
| Isostearic acid | 0.1 | 0.1 |
| Subtotal | 76.9 | 46.9 |
| Total | 199.8 | 140.0 |

[1]Wetting agent commercially available as DISPERBYK 163 from BYK-Chemie USA.
[2]Polymethylsiloxane solution commercially available as DC-200 from Dow Corning Corp.
[3]Methylamyl ketone ketimine of diethylene triamine, 78% resin solids in methylamyl ketone.

COMPARATIVE EXAMPLE 14

By way of comparison, this example describes the preparation of a two component curable sealer coating composition which contains in the crosslinker component an acetoacetate functional polyester only, with no acetoacetate functional siloxane. The pre-blended crosslinker component, which contains the acetoacetate functional polyester, was combined under agitation with the pigmented component just prior to application to a metal substrate.

| INGREDIENT | Formula Weight (grams) | Solid Weight (grams) |
|---|---|---|
| PIGMENTED COMPONENT: | | |
| Methyl amyl ketone | 2.7 | — |
| Butyl acetate | 2.6 | — |
| Xylene | 2.9 | — |
| Novalac ketimine resin as in Example 10 | 20.4 | 16.6 |
| Methyl isobutyl ketone | 2.7 | |

-continued

| INGREDIENT | Formula Weight (grams) | Solid Weight (grams) |
|---|---|---|
| Polyethylene wax as in Example 13 | | |
| Anti-settling agent | 0.8 | 0.8 |
| Silicone additive as in Example 13 | 1.3 | 0.7 |
| Talc | 17.9 | 17.9 |
| Neutral TiO$_2$ | 27.6 | 27.6 |
| Barium sulfate | 18.8 | 18.8 |
| Silica | 0.4 | 0.4 |
| Carbon black | 0.2 | 0.2 |
| Silicone additive DC 200 | 0.2 | 0.1 |
| Methyl isobutyl ketone | 5.3 | — |
| Ketimine resin in MAK as in Example 13 | 7.1 | 5.5 |
| Methyl amyl ketone | 5.7 | — |
| Butyl benzyl phthalate | 4.3 | 4.3 |
| Silicone additive DISPERBYK | 0.7 | — |
| Subtotal | 122.9 | 93.1 |
| Acetone | 11.9 | — |
| Methyl amyl ketone | 15.3 | — |
| Xylene | 2.8 | — |
| Polyester acetoacetate as in Example 11 | 39.4 | 39.4 |
| Adhesion promoter as in Example 13 | 3.7 | 3.7 |
| Diacrylate resin as in Example 13 | 3.7 | 3.7 |
| Isostearic acid | 0.1 | 0.1 |
| Subtotal | 76.9 | 46.9 |
| Total | 199.8 | 140.0 |

Test panels were prepared by hand sanding APR24711 test panels supplied by ACT Laboratories, Inc. with 360 grit paper to remove contaminants and cleaning to remove sanding residue. The sealer coating formulations of Example 13 and Comparative Example 14 were spray applied to prepared test panels using conventional spray equipment and allowed to cure at ambient conditions for 4 hours. A commercial basecoat/clearcoat system, DBU-3822/DCU-2001 available from PPG Industries, Inc., was applied to the cured sealers and allowed to cure at ambient conditions for one week. The multilayer coating systems were then tested for chip resistance by impacting the coated panels with 3 mm steel shot and varying velocities at −22° C. Results are reported as the average area of coating which exhibits failure caused by impacts at each of three impact speeds. Chip resistance test results are reported for sealer coatings of Example 13 and Comparative Example 14 in the following TABLE 3.

TABLE 3

| SPEED OF IMPACT | AVG. AREA DAMAGED EXAMPLE 13 | AVG. AREA DAMAGED EXAMPLE 14 (COMPARATIVE) |
|---|---|---|
| 55 mph | 13.7 mm$^2$ | 46.3 mm$^2$ |
| 75 mph | 25.4 mm$^2$ | 63.6 mm$^2$ |
| 95 mph | 33.3 mm$^2$ | 79.0 mm$^2$ |

What is claimed is:

1. An acetoacetate functional polysiloxane having the general structural formula:

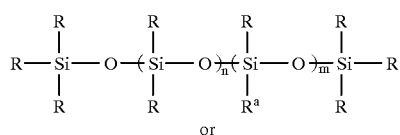

or

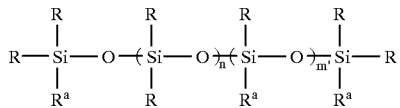

wherein R$^a$ is an acetoacetate containing group and a portion of the groups represented by R$^a$ contains at least two groups having the general structure:

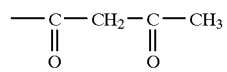

where the R groups are selected from the group consisting of OH and monovalent hydrocarbon groups connected to the silicon atoms, m is at least one; m' is 0 to 50, and n is 0 to 50.

2. The acetoacetate functional polysiloxane of claim 1 wherein a portion of the groups represented by R$^a$ contains at least two groups having the general structure:

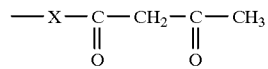

where X is O or S.

3. The functional polysiloxane of claim 2 wherein at least one of the groups represented by R$^a$ contains a group having the general structure:

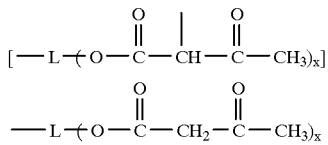

where L is an organic linking group and x is 2 to 3.

4. The functional polysiloxane of claim 3 wherein L is alkylene, oxyalkylene or alkylene aryl.

5. The functional polysiloxane of claim 4 wherein the oxyalkylene group is a C$_4$ to C$_{20}$ oxyalkylene group.

6. The functional polysiloxane of claim 2 having the following general structural formula:

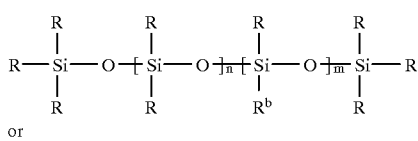

or

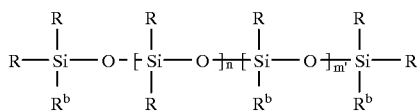

where m is at least one; m' is 0 to 50; n is 0 to 50; R is selected from the group consisting of OH and monovalent hydrocarbon groups connected to the silicon atoms; wherein R$^b$ is an acetoacetate containing group and a portion of the groups represented by R$^b$ has the following structure:

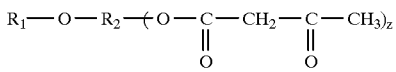

wherein $R_1$ is alkylene, oxyalkylene or alkylene aryl; $R_2$ is alkylene, oxyalkylene or alkylene aryl; and z is 2 to 3.

7. The functional polysiloxane of claim 5 wherein the ratio of n:m and n:m' is from about 0.1 to 10:1.

8. A functional polysiloxane which is the reaction product of the following reactants:

(a) an polysiloxane containing silicon hydride represented by the general formula:

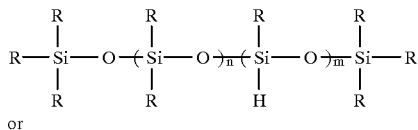

or

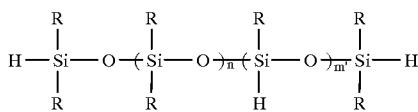

wherein the R groups are selected from the group consisting of OH and monovalent hydrocarbon groups connected to the silicon atoms; n is 0 to 50; m is at least one; and m' is 0 to 50, such that the ratio of hydrogen-bonded silicon atoms to non-hydrogen-bonded silicon atoms is from about 0.1 to 10:1;

(b) at least one alcohol a portion of which contains at least two primary hydroxyl groups and containing vinyl or vinylidene groups which are capable of hydrosilylating said polysiloxane containing silicon hydride; and (c) an acetoacetate.

9. The functional polysiloxane of claim 8 wherein the polysiloxane containing silicon hydride is 1,1,3,3-tetramethyl dihydrosiloxane.

10. The functional polysiloxane of claim 8 wherein n+m and n+m' is 3 to 4.

11. The functional polysiloxane, of claim 8 wherein the alcohol is an allylic polyoxylene alcohol, a portion of which contains two or more primary hydroxyl groups.

12. The functional polysiloxane of claim 8 wherein a portion of the alcohol is trimethylolpropane monoallylether.

13. The functional polysiloxane of claim 8 wherein at least a portion of the alcohol is polyethoxylated allyl alcohol.

14. The functional polysiloxane of claim 8 wherein the acetoacetate is selected from the group consisting of methyl acetoacetate, ethyl acetoacetate, t-butyl acetoacetate, alpha-methylacetate and haloacetoacetate.

15. A method of preparing an acetoacetate functional polysiloxane comprising:

a) hydrosilylating a polysiloxane containing silicon hydride where the ratio of hydrogen-bonded silicon atoms to non-hydrogen-bonded silicon atoms is from about 0.1 to 10:1, with an alcohol at-least a portion of which contains at least two primary hydroxl groups, primary or secondary amine, or thiol containing vinyl or vinylidene groups which are capable of hydrosilylating said polysiloxane containing silicon hydride, to yield a polysiloxane containing primary hydroxyl, amine or thiol groups or mixtures theoof; and (b) esterifying the hydrosilylated reaction product of (a) with an acetoacetate to produce an acetoacetate functional polysiloxane.

16. The method as recited in claim 15 wherein the polysiloxane containing silicon hydride is hydrosilylated with an alcohol containing vinyl or vinylidene groups, at-least a portion of which rontains at least two primary hydroxyl groups.

17. The method as recited in claim 15 wherein the acetoacetate functional polysiloxane has the general formula:

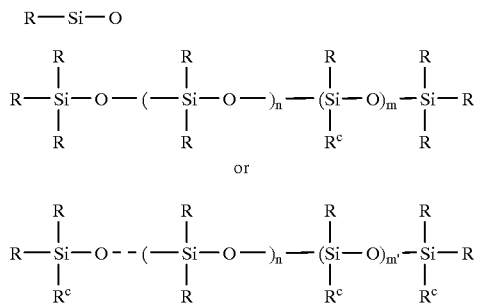

wherein $R^c$ is an acetoacetate containing goup and a portion of the groups represented by $R^c$ contains at least two groups having the general structure:

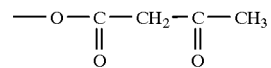

where the R groups are selected from the group consisting of OH and monovalent hydrocarbon groups connected to the silicon atoms, m is at least one; m' is 0 to 50, and n is 0 to 50.

18. The method as recited in claim 15 wherein the acetoacetate is t-butyl acetoacetate.

19. The method as recited in claim 15 wherein the alcohol is an alkenyl polyoxyalkylene alcohol at least a portion of which contains two or more primary hydroxyl groups.

20. The method as recited in claim 15 wherein the alcohol which contains two or more primary hydroxyl groups is selected from the group consisting of trimethylolpropane monoallylether, pentaerytbritol monoallylether, and mixtures thereof.

* * * * *

UNITED STATES PATENT AND TRADEMARK OFFICE
CERTIFICATE OF CORRECTION

PATENT NO. : 5,952,443
DATED : September 14, 1999
INVENTOR(S) : Truman F. Wilt et al.

It is certified that error appears in the above-identified patent and that said Letters Patent is hereby corrected as shown below:

Column 22, lines 35-37, delete the chemical structure listed.

Column 22, line 43, delete "otganic" and insert therefor --organic--.

Column 22, lines 51-60, delete the two chemical structures listed and insert therefor:

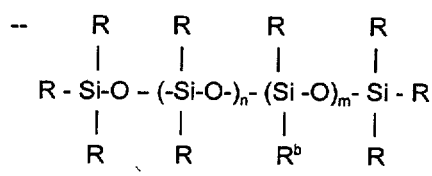

or

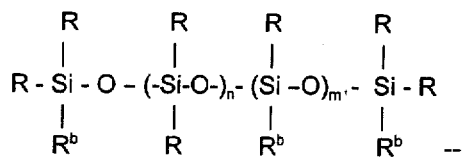

Column 23, lines 48-49, delete "at least".

Column 24, line 2, delete "at-least".

Column 24, line 15, delete "at-least".

UNITED STATES PATENT AND TRADEMARK OFFICE
CERTIFICATE OF CORRECTION

PATENT NO. : 5,952,443
DATED : September 14, 1999
INVENTOR(S) : Truman F. Wilt et al.

It is certified that error appears in the above-identified patent and that said Letters Patent is hereby corrected as shown below:

Column 24, line 15, delete "rontains" and insert therefor --contains--.

Column 24, line 21, delete the chemical structure "R—Si—O".

Column 24, line 34, delete "goup" and insert therefor --group--.

Column 24, line 50, delete "at least".

Column 24, line 55, delete "pentaerytbritol" and insert therefor --pentaerythritol--.

Signed and Sealed this

Twenty-ninth Day of August, 2000

*Attest:*

Q. TODD DICKINSON

*Attesting Officer*      *Director of Patents and Trademarks*